US005570956A

United States Patent [19]

Gabriele

[11] Patent Number: 5,570,956

[45] Date of Patent: Nov. 5, 1996

[54] AGITATOR SHAFT TOE MOUNT FOR INCLINED AND VERTICAL AGITATORS

[75] Inventor: Valentino Gabriele, Baltimore, Md.

[73] Assignee: J. C. Padro & Sons, Baltimore, Md.

[21] Appl. No.: 567,039

[22] Filed: Dec. 4, 1995

[51] Int. Cl.[6] .............................. B01F 7/04; F16C 17/08

[52] U.S. Cl. .............................. 366/312; 366/331; 384/246

[58] Field of Search .............................. 366/64–67, 96–98, 366/279, 287, 309, 311, 312, 314, 331; 99/348; 384/243–246, 912, 913

[56] References Cited

U.S. PATENT DOCUMENTS

| | | | |
|---|---|---|---|
| 405,559 | 6/1889 | Johansson | 384/243 X |
| 1,096,524 | 5/1914 | Anker-Holth | 384/243 |
| 1,557,600 | 10/1925 | Mademann | 384/243 |
| 1,668,839 | 5/1928 | Cureton | 384/243 |
| 2,027,756 | 1/1936 | Tay | 366/312 X |
| 2,723,110 | 11/1955 | Collins | 366/331 |
| 3,752,057 | 8/1973 | Groen, Jr. | 366/312 X |
| 4,199,266 | 4/1980 | Giusti | 99/348 X |
| 4,525,072 | 6/1985 | Giusti | 99/348 X |
| 4,571,091 | 2/1986 | Pardo et al. | 366/311 |
| 4,790,667 | 12/1988 | Pardo et al. | 366/311 |
| 4,818,116 | 4/1989 | Pardo et al. | 366/311 |
| 5,421,651 | 6/1995 | Pickering et al. | 366/311 |

FOREIGN PATENT DOCUMENTS

| | | | |
|---|---|---|---|
| 589939 | 6/1925 | France | 384/246 |
| 4238 | 3/1890 | United Kingdom | 384/243 |

*Primary Examiner*—Charles E. Cooley
*Attorney, Agent, or Firm*—Kenneth E. Darnell

[57] ABSTRACT

A shaft toe mount intended for inclined or vertical agitators such as are used for the processing of materials including food materials in a kettle, the present toe mount provides a bearing surface for that end of a rotary shaft of the agitator which extends into the interior of the kettle. Agitators advantageously mounted by the shaft toe mount of the invention include mixing structures capable of stirring or mixing operations within a kettle and particularly when inner walls of the kettle are to be scraped to prevent material adhesion or "burn-on" such as occurs when food materials are heated and/or cooked within a kettle. The present shaft toe mount is configured to allow rapid removal from the kettle so that the mount as well as the kettle and agitator can be cleaned daily according to accepted standards of cleanliness. The present mount is also formed of materials meeting USDA standards for metal to metal contact in food processing situations where the use of lubricants is proscribed, the mount also being repairable in the event of excessive wear or damage to the mount.

19 Claims, 3 Drawing Sheets

AGITATOR SHAFT TOE MOUNT FOR INCLINED AND VERTICAL AGITATORS

BACKGROUND OF THE INVENTION

1. Field of the Invention

The invention relates generally to structures for mounting an end of a rotary shaft of a mixing agitator in relation to an inner wall of a kettle within which materials are to be mixed or stirred, the structures of the invention providing a toe bearing mounting capability while allowing rapid disassembly for cleaning purposes.

2. Description of the Prior Art

The processing of many materials including pharmaceuticals, foodstuffs and the like on an industrial scale often requires mixing or stirring operations and, in some circumstances, the scraping of inner wall surfaces of a kettle within which materials are being mixed. Scraping of wall surfaces is particularly necessary in many situations involving the heating and/or cooking of food materials in large cooking kettles. Examples of mixing agitators which include a kettle wall scraping capability are disclosed in U.S. Pat. Nos. 3,752,057 to Groen, Jr.; 4,571,091 to Pardo et al and 4,790,667 to Pardo et al. The Pardo et al agitators include rotary shafts mounted within a kettle with the shaft disposed horizontally. Mounting of the Pardo et al horizontal agitators is readily accomplished through the use of bearing structure as is disclosed in the Pardo et al patents. That bearing structure described by Pardo et al allows rapid disassembly of the agitator structure and bearing structure such that daily cleaning can be easily accomplished. Groen, Jr., in U.S. Pat. No. 3,752,057 describes a mixing agitator having a shaft which extends into a kettle at an angle of at least 20° with respect to the vertical axis of the kettle. The Groen, Jr. agitator is exemplary of an inclined agitator. However, many inclined agitators are configured with the inclined shafts thereof being mounted to a bearing located on an inner wall of a kettle so that the end of the inclined shaft extending into the kettle has a bearing support. Inclined agitators so configured can provide only stirring or mixing functions or can be fitted with scraping elements which allow scraping of wall surfaces of the kettle such as during a heating/cooking operation within the kettle. Certain other mixing agitators, some of which include scraping elements, are configured with the rotary shafts thereof disposed in a substantially vertical orientation with one end extending into the interior of a kettle or other container within which mixing operations occur. While vertically oriented agitators can be "held" by structure mounting the end of the agitator which is disposed outside of the kettle without contact, even through bearing surfaces, between inner walls of the kettle and that end of the shaft extending into the kettle, it is a common occurrence in the art to provide a bearing mounted to the inner wall of a kettle, such as at its lowermost location, so that the vertical shaft of the agitator can be mounted with at least the lower end of the agitator shaft within the kettle. Bearing structures of the prior art which are mounted to inner walls of a kettle for mounting inclined or vertical mixing agitators suffer from a number of disadvantages not the least of which is product standards which must be adhered to when metal to metal contact occurs within the body of food materials being processed. Such bearings must operate within proscriptions of law relating to the use of lubricants within the body of food materials being processed. Such bearing surfaces also must be formed of materials which comply with legal regulations involving metal to metal contact within the body of food materials being processed such as application of heat to the food materials during mixing, stirring and/or scraping of kettle wall surfaces. Prior art bearing structures also are generally not capable of repair due to the fact that the bearings are welded to inner walls of a kettle, excessive wear of the bearing or damage to the bearing thereby rendering the entire assembly useless.

The present invention provides a shaft toe mount useful with both inclined and vertical agitators in the processing of materials which can include the heating and/or cooking of food materials in a kettle either with or without scraping of inner walls of the kettle. The present shaft toe mount is configured to allow rapid removal from a kettle so that the mount as well as the kettle and agitator can be disassembled easily for cleaning on a daily basis according to accepted standards of cleanliness. The present shaft toe mount of the invention is formed of materials which meet USDA standards for metal to metal contact within a body of food materials being processed and in food processing situations where the use of lubricants is closely regulated. The present shaft toe mount of the invention can also be readily and rapidly repaired in the event of excessive wear or damage to the structure of the mount. Accordingly, the present invention provides substantial performance, operational and cost advantages over those bearing structures previously used in the art for the mounting of the rotary shaft of a mixing agitator structure used in a kettle for processing of materials including food materials, pharmaceuticals, and the like.

SUMMARY OF THE INVENTION

The present invention provides a shaft toe mounting structure capable of being used to mount a rotary shaft, such as the shaft of an inclined or vertical agitator, within the interior of a processing kettle within which material such as foodstuffs, pharmaceuticals or the like are to be processed. The shaft toe mount of the invention provides a bearing surface for that end of a rotary shaft of an inclined or vertical agitator which extends into the interior of the kettle. The shaft toe mount of the invention is configured to allow rapid removal of the mount as well as the agitator from the interior of the kettle so that the mount, agitator and kettle can be readily cleaned daily according to cleanliness standards common in the industry. The toe mount is also formed of materials which do not require lubrication on bearing surfaces, the structure therefore meeting USDA standards for metal to metal contact for bearing surfaces and the like which function immersed in food materials being processed, such situations being commonplace especially in the food processing industry. The structure of the present invention is also repairable in the event of excessive wear or damage to the mount.

The shaft toe mount of the invention includes a toe bearing element which is formed of a corrosion-resistant, anti-galling nickel base alloy such as is manufactured by Waukesha Foundry, Inc. of Waukesha, Wis., the preferred nickel base alloy useful according to the invention being known as 88 Alloy. While other alloys produced by Waukesha Foundry, Inc., such as nickel base alloys known as 23 Alloy and 54C Alloy, can also be used especially in the event that operating temperatures higher than the nominal operating temperatures of 88 Alloy are necessary. In the case of 23 Alloy, operating temperatures of 600° F. can be accommodated while 54C Alloy allows use at temperatures up to 1600° F. In the food processing industry, the use of the 54C Alloy is not necessary. The 88 Alloy serves particularly well as the toe bearing element of the present shaft toe mount since the toe bearing element so formed can be used in contact with stainless steel, chromium plate and a number of other metals without galling or seizing due to the chafing action of metal bearing surfaces which occurs on rotation of an agitator shaft mounted by the present shaft toe mount. Use of the 88 Alloy as preferred allows rotary operation of an agitator shaft without galling or seizing and within a metal to metal environment wherein the use of lubricants is prohibited. The 88 Alloy forming the toe bearing element of the shaft toe mount is formed into a bearing surface which mates with a stainless steel bearing surface located on the end of the agitator shaft which extends into the interior of a processing kettle and into bearing contact with the toe bearing element of the shaft toe mount.

The shaft toe mount of the invention is preferably mounted to a processing kettle such as through a shaft sleeve which defines an opening in the kettle either at the lowermost portion thereof as in the case of the use of a vertical shaft agitator, or offset from the bottom of the kettle such as when an inclined agitator is used. The shaft toe mount is mounted into the shaft sleeve such as through the use of a retaining nut coupled with threaded elements at the free end of the shaft sleeve such that the toe bearing element formed of 88 Alloy extends into the interior of the kettle and receives mating bearing surfaces formed in the end of the rotary shaft of an agitator. As can be readily recognized, it is not necessary to weld a bearing structure onto an inner wall of a kettle in order to provide the necessary bearing surface. Accordingly, it is not necessary to provide a weephole such as is common practice with bearing structures mounted to inner surfaces of processing kettles such as by welding or the like.

The shaft toe mount of the invention, being mounted in the shaft sleeve by means of a single retaining nut, is thus rapidly and easily removed from the kettle for daily cleaning or for repair in the event of excessive wear or damage to the mount. The invention thus provides substantial advantages over the prior art especially in food processing situations wherein most bearing surfaces provided on inner walls of food processing kettles do not meet sanitary standards even though such structures have long been used in the art.

It is therefore an object of the invention to provide a shaft toe mount intended for mounting inclined or vertical agitator shafts such as are used for the processing of materials including food materials in a kettle, the mount providing a bearing surface for that end of a rotary shaft of the agitator which extends into the interior of the kettle.

It is another object of the invention to provide a shaft toe mount capable of providing a bearing surface for the end of an inclined or vertical agitator mounted in operative relation to a processing kettle wherein lubrication is not required.

It is a further object of the invention to provide a shaft toe mount intended to mount either inclined or vertical agitators within a processing kettle and wherein the shaft toe mount can be rapidly and easily removed from the kettle for cleaning according to accepted standards of cleanliness.

It is a still further object of the invention to provide a shaft toe mount which can be removed from a kettle for repair in the event of excessive wear or damage to the mount.

Other objects and advantages of the invention will become more readily apparent in light of the following detailed description of the preferred embodiments.

DESCRIPTION OF THE PREFERRED EMBODIMENTS

Figure 1:
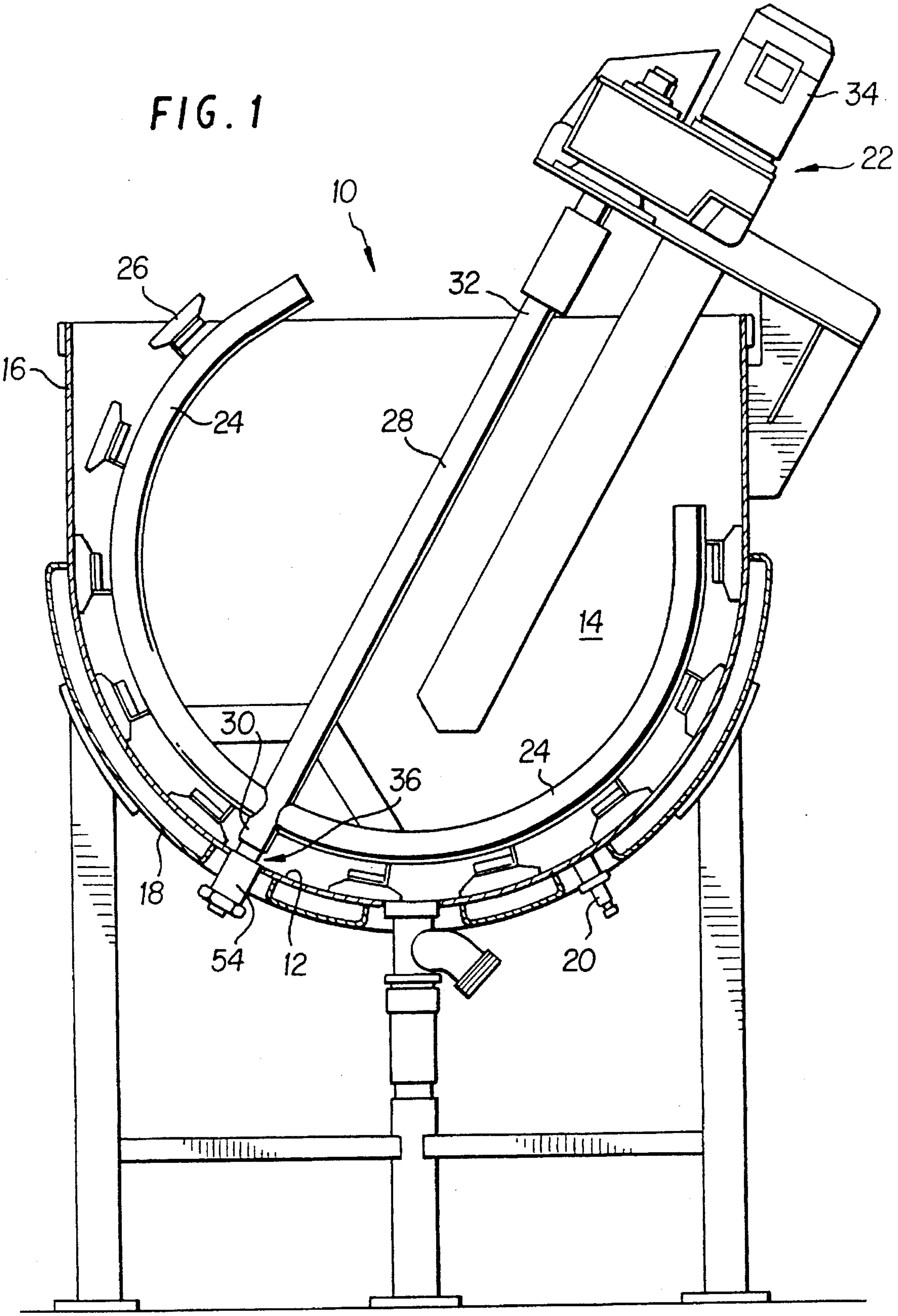
FIG. 1 is an elevational view in partial section of an inclined agitator and mixing kettle arrangement having a shaft toe mount of the invention mounted to the kettle and functioning to mount that end of the agitator disposed within the interior of the kettle.

Referring now to the drawings and particular to FIG. 1, a kettle having inner walls 12 which contact a material being processed within the kettle is seen to include a semi-spherical lower portion 14 and a cylindrical upper portion 16 as is conventional in the art. A steam jacket 18 can be formed onto the exterior walls of the semi-spherical lower portion 14 of the kettle 10 in order to heat the kettle so that a heating and/or cooking function can occur within the interior of the kettle 10. It is to be understood that the kettle 10 can be utilized to heat and/or cook food materials or to heat or otherwise process other materials including pharmaceuticals, cosmetics and other materials. It is also to be understood that materials held within the kettle 10 can merely be stirred or mixed either with or without heating according to the exigencies of a particular processing situation. The kettle 10 can be heated by means of steam or other heated fluid circulated within the steam jacket 18. Alternatively, the kettle 10 can be fired by a combustible material such as a gas as is conventional in the art. In order to determine temperatures within a kettle 10 a temperature probe 20 is seen to be mounted in an opening through the steam jacket 18 to facilitate control of a heating or cooking process within the kettle 10.

An inclined agitator 22 is seen to be mounted in operating relation to the kettle 10 as is conventional in the art, the agitator 22 having curvilinear supports 24 which mount scraping elements 26 in a conventional manner to scrape the walls 12 of the kettle 10. Scraping of the walls 12 of the kettle 10 is often necessary in food cooking operations where it is necessary to prevent adhesion or "burn-on" of food materials onto the walls 12 during a cooking operation. The inclined agitator 22 further comprises a rotary shaft 28 which mounts the supports 24 near distal end 30 of the shaft 28. The distal end 30 of the shaft 28 extends into the interior of the kettle 10 while the free end 32 of the shaft 28 extends outwardly of the kettle 10 and mounts to a drive system 34 which is also conventional in the art. Further details of the agitator 22 and the drive system 34 are not necessary to an understanding and appreciation of the present invention since the present invention relates to a mounting of the distal end 30 of the rotary shaft 28 internally of the kettle 10 as will now be described.

Figures 2, 3:
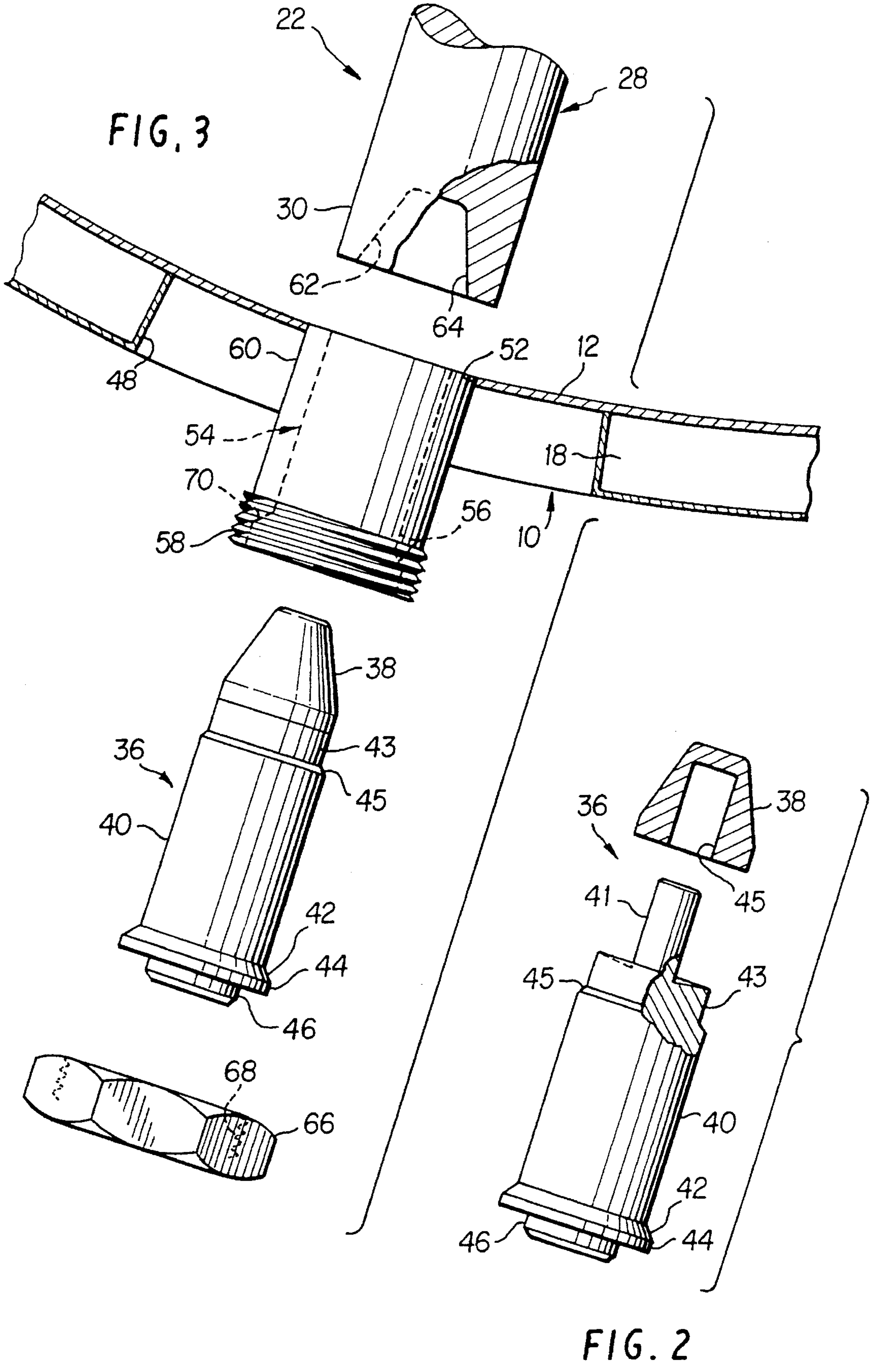
FIG. 2 is an assembly view in partial section of the shaft toe mount of the invention.
FIG. 3 is a detailed elevational view in partial section of a shaft toe mount of the invention in an assembly relationship with that portion of a kettle into which the shaft toe mount extends and in assembly relationship with the end of the rotary shaft of the agitator which extends into the interior of the kettle; and, FIG. 4 is a detailed elevational view in partial section of the shaft toe mount of the invention assembled with the kettle and functioning as a toe bearing relative to that end of the agitator which extends into the interior of the kettle.
Figure 4:
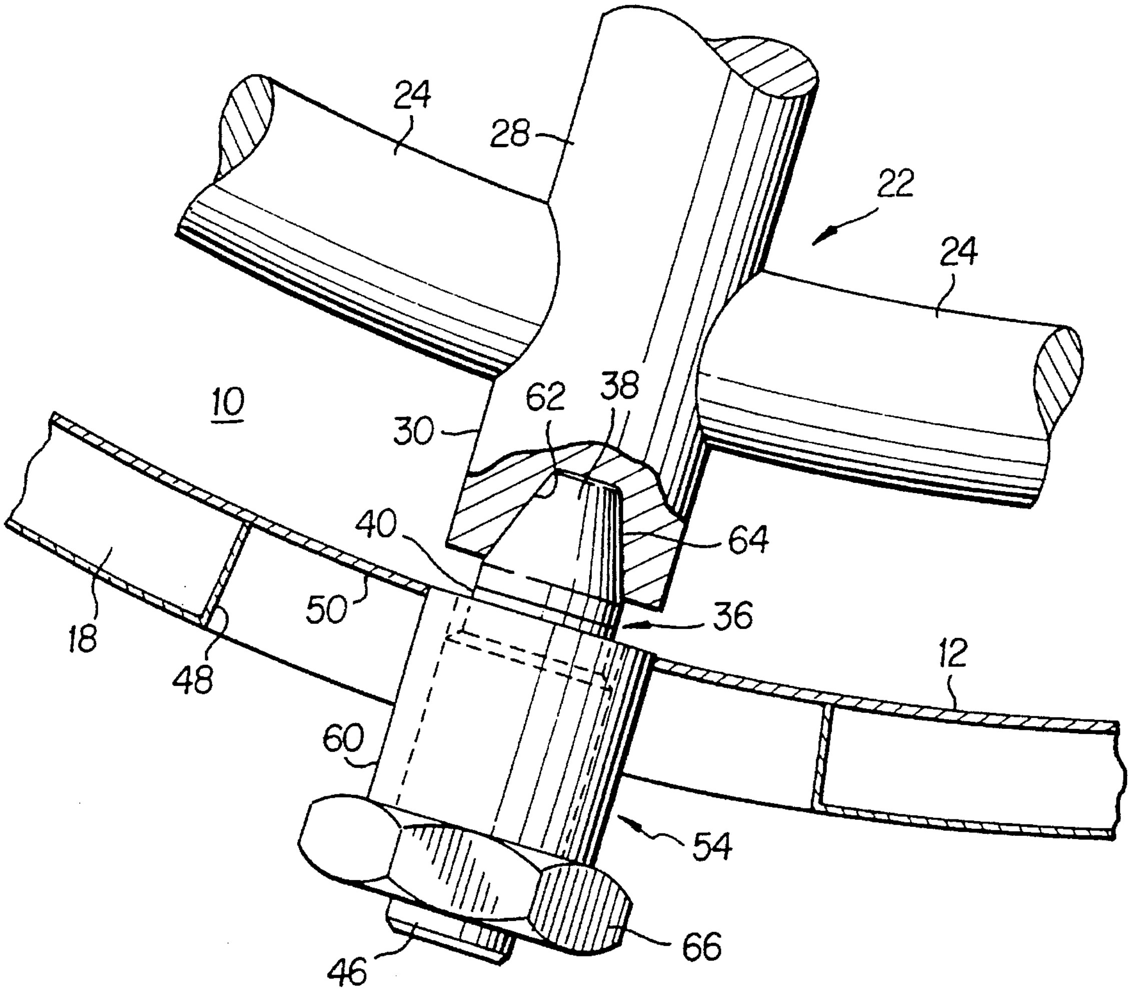

The invention takes the form of a shaft toe mount seen generally at 36 and shown in FIG. 1 in an assembled condition with the kettle 10 and the rotary shaft 28 of the agitator 22. A detailed elevational view in partial section is seen in FIG. 4 and provides a better understanding of the structure of the shaft toe mount 36 than is provided in the less detailed view of FIG. 1. FIGS. 2 and 3 provide a more detailed view of the shaft toe mount 36 per se since these figures show the mount 36 in assembly relationships with associated structure which provide for mounting of the shaft toe mount 36 to the kettle 10.

Referring now particularly to FIG. 2, the shaft toe mount 36 is seen to be formed of a toe bearing element 38 which is preferably formed of a solid piece of a nickel base alloy which is corrosion-resistant and anti-galling and which particularly allows metal to metal contact without the need for lubrication other than that provided by the toe bearing element 38 itself. The toe bearing element 38 is particularly formed of a material known as 88 Alloy which is a product of the Waukesha Foundry, Inc. of Waukesha, Wis., further description of the 88 Alloy being provided hereinafter. The toe bearing element 38 has a central hollowed-out channel 45 which receives a mounting base 41 to allow the element 38 to be press fit to the shaft toe mount 36. The shaft toe mount 36 is formed of toe shaft 40, the shaft 40 being an elongated cylindrical body member. The diameter of the mount 36 reduces in diameter from the larger diameter of the toe shaft 40 to the smaller diameter of base element 43 by the provision of the bevel 45. The shaft 40, the bevel 45, the base element 43, and the mounting base 41 can be unitarily formed of stainless steel or similar material or may be separately formed and then attached together. The toe shaft 40 may be tubular or solid. The toe shaft 40 is of a greater diameter than the base element 43 for strength. The mounting base 41 takes the form of an elongated cylinder which is of a size to be press fit into the channel 45 of the toe bearing element 38. Perimetric peripheral edges of the mounting base 41 are preferably radiused slightly to facilitate fitting of said base 41 into the channel 45. Perimetric edges of the base element 43 are also preferably radiused.

At the opposite end of the toe shaft 40 from the mounting base 41, an annular bevel 42 is preferably formed integrally with the toe shaft 40. The annular bevel 42 terminates in a cylindrical shoulder 44 which then reduces in diameter to a cylindrical terminal portion 46.

As can best be seen in FIGS. 3 and 4, the steam jacket 18 has a discontinuity or opening 48 which allows direct access to wall portion 50 of the kettle 10. An opening 52 formed in the wall portion 50 is defined by a shaft sleeve 54, the shaft sleeve 54 being cylindrical in conformation and having a bore or channel formed centrally therein. The shaft sleeve 54 terminates at its free end with a threaded portion 58 formed on a cylindrical portion 60 of the shaft sleeve 54 which is slightly larger in diameter than are the remaining portions of the shaft sleeve 54. The shaft sleeve 54 is mounted onto the wall portion 50 of the kettle 10 such as by welding or the like.

As is best seen in a consideration of both FIG. 3 and FIG. 4, the shaft toe mount 36 is inserted into the bore 56 of the shaft sleeve 54, the toe bearing element 36 thereby being positioned within the interior of the kettle 10 to mate with the distal end 30 of the rotary shaft 28. The distal end 30 of the rotary shaft 28 has a depression 62 formed in the end of the shaft 28 and along the longitudinal axis thereof, the depression 62 being shaped essentially identically to the shape of the toe bearing element 38 to form a bearing surface 64 against which surfaces of the toe bearing element 38 provide contact. Accordingly, the shaft 28 rotates with the bearing surface 64 thereof moving against outer surfaces of the toe bearing element 38. The material from which the toe bearing element 38 is formed provides sufficient lubrication for rotation of the shaft 28 while complying with standards such as are applied in the food processing arts for metal to metal contact within the body of a food material, for example, being processed.

Referring now again to FIGS. 3 and 4, it is to be seen that a retaining nut 66 which is internally threaded about a central bore 68 shown in phantom is received onto the cylindrical terminal portion 46 of the shaft toe mount 36 with the loose combination thereof being inserted into the shaft sleeve 54. The bore 68 of the retaining nut 66 has a diameter such that the nut is easily received over the cylindrical terminal portion 46 of the shaft toe mount 36. At a certain point during insertion of the shaft toe mount 36 and retaining nut 66 onto the shaft sleeve 54, surfaces of the annular bevel 42 of the toe bearing element 38 bias against annular detent surfaces 70 which effectively are beveled surface portions of the bore 56 of the shaft sleeve 54, the surfaces 70 being located toward the free end of the shaft sleeve 54 and positioned such that the toe bearing element 38 will extend an appropriate distance into the interior of the kettle 10 when the annular bevel 42 on the shaft toe mount 36 contacts the annular detent surfaces 70 so that further insertion of the shaft toe mount 36 is prevented. At this point in the insertion of the shaft toe mount 36 into the shaft sleeve 54, the retaining nut 66 is located relative to the threaded portion 58 of the shaft sleeve 54 such that the retaining nut can be threaded onto said threaded portion 58 and tightened by means of a wrench or the like so that the shaft toe mount 36 is properly positioned on the kettle 10 to receive the distal end 30 of the rotary shaft 28 as aforesaid. The diameter of the toe shaft 40 is dimensioned to be flushly received into the interior of the bore 56 formed in the shaft sleeve 54 with only a minimum of clearance therebetween to allow insertion and removal of the shaft toe mount 36 from the shaft sleeve 54.

After a period of use of the kettle 10 and the agitator 22, it becomes necessary in view of cleanliness standards to remove the agitator 22 from the kettle 10 for cleaning of the agitator and kettle as well as all structure associated therewith. The shaft toe mount 36 can be rapidly and easily removed from the kettle 10 to allow cleaning of the shaft toe mount 36 and to facilitate removal of the agitator 22 from the kettle 10. The removal process involves removing the retaining nut 66 by means of a wrench or the like while holding the cylindrical terminal portion 46 of the shaft toe mount 36 so that final removal of the nut 66 does not result in dropping of the shaft toe mount 36 which could damage the toe bearing element 38 or the annular bevel 42 inter alia which would seriously impair functioning of the shaft toe mount 36. While the retaining nut 66 lies in the palm of the hand of the workman, the shaft toe mount 36 is gently pulled out of the shaft sleeve 54 and then cleaned. The shaft sleeve 54 would then also be cleaned both interiorly and exteriorly as the kettle 10 is also cleaned. The retaining nut 66 is also cleaned in accordance with sanitary standards. Prior to re-assembly of the shaft toe mount 36 into the shaft sleeve 54, a light coat of Chesterton 622 food grade grease or equivalent is applied to the toe shaft 40 and internal portions of the shaft sleeve 54.

The shape of the toe bearing element 38 can be chosen to provide a desired bearing surface, the shape of the bearing surface 64 being essentially that same shape in order to receive the toe bearing element 38. As is seen in the drawings, the toe bearing element 38 is effectively formed of a "bullet" shape which could be described as a distally flattened ogive shape. In essence, the shape of the toe bearing element 38 is substantially conical with a section taken through the cone approximately two-thirds of the distance from the base thereof, a substantially level distal portion of the toe bearing element 38 disposed about the longitudinal axis thereof then being rounded annularly to the frusto-conical annular lower body of the toe bearing element 38. Other shapes can be selected for the toe bearing element 38 without departing from the scope of the invention.

The toe bearing element 38 is formed of a nickel base alloy produced by Waukesha Foundry, Inc. as alluded to hereinabove. The alloy particularly intended for use is known as 88 Alloy and is nominally formed of nickel with the following alloy constituents:

| | |
|---|---|
| Carbon | .03% |
| Tin | 4.0% |
| Manganese | 1.0% |
| Molybdenum | 3.0% |
| Iron | 1.5% |
| Bismuth | 4.0% |
| Silicon | .30% |
| Chromium | 12.5% |

While the 88 Alloy produced by Waukesha Foundry, Inc. is preferred, it is to be understood that other materials can be employed including other alloys produced by Waukesha Foundry, Inc. For processing situations wherein added lubrication can be employed without violation of governmental standards, materials other than the Waukesha alloys can be employed. It is further to be understood that the toe bearing element 38 can be formed of stainless steel or the like while the material defining the bearing surface 64 in the distal end 30 of the rotary shaft 28 could be formed of a self-lubricating material such as the Waukesha alloys described herein.

While the invention has been described in relation to the particular structure shown in the drawings, it is to be understood that the invention can be otherwise configured while remaining in the intended scope of the invention. As a primary example, it is to be understood that the shaft toe mount 36 of the invention can function with the kettle 10 at any desired location whereby the distal end of an inclined agitator or vertical agitator is to be disposed within the confines of the kettle 10. Particularly, the shaft sleeve 54 can be disposed at the lowermost portion of the kettle 10 in order to accommodate the rotary shaft of a vertical agitator. In such a situation, the shaft toe mount 36 of the invention can take the same form as that used for the inclined agitator 22 as is shown and described herein.

What is claimed is:

1. In combination, a kettle having inner walls and an agitator having a rotary shaft, the rotary shaft having a distal end extending into the interior of the kettle and having a free end extending from the interior of the kettle and mounted to a drive system for rotation of the shaft to mix materials being processed within the kettle, the combination further comprising:

shaft toe mounting means for mounting the distal end of the rotary shaft relative to the inner walls of the kettle and comprising a cylindrical body element, a toe bearing element mounted to one end of the cylindrical body element and an annular bevel formed at the other end of the cylindrical body element;

sleeve means formed on a wall of the kettle for receiving at least portions of the shaft toe mounting means thereinto and the sleeve means having a detent formed in the interior thereof functioning to contact the bevel formed on the cylindrical body element and thus to limit the degree of reception of the shaft toe mounting means thereinto, the location of the detent allowing the toe bearing element to extend into the interior of the kettle; and, retaining means for holding the shaft toe mounting means within the sleeve means with at least a portion of the shaft toe mounting means extending into the interior of the kettle, at least a portion of that portion of the shaft toe mounting means extending into the interior of the kettle comprising first bearing surfaces, the toe bearing element having the first bearing surfaces formed thereon, a depression formed in the distal end of the rotary shaft having second bearing surfaces of a shape substantially complementary to the shape of the first bearing surfaces, the rotary shaft rotating relative to the shaft toe bearing means and being mounted thereby with said bearing surfaces facilitating rotation therebetween.

2. The combination of claim 1 wherein either the first or second bearing surfaces are formed of a self-lubricating nickel alloy and the other of the bearing surfaces is formed of stainless steel.

3. The combination of claim 2 wherein the first bearing surfaces are formed of a self-lubricating nickel alloy.

4. The combination of claim 1 wherein the first bearing surfaces are formed of a self-lubricating nickel alloy.

5. The combination of claim 1 wherein the sleeve means is formed on the kettle at the lowermost location thereof to mount a vertical agitator.

6. The combination of claim 1 wherein the sleeve means is formed on the kettle at a location spaced from the lowermost location thereof to mount an inclined agitator.

7. The combination of claim 1 wherein the toe bearing element is formed of a self-lubricating nickel alloy.

8. The combination of claim 7 wherein the sleeve means comprises a cylindrical body and has a bore extending therethrough for reception of the shaft toe mounting means, the detent comprising an enlarged portion of the bore and taking the form of an annular bevel dimensioned to seal against and receive outer surfaces of the annular bevel formed on the body element of the shaft toe mounting means.

9. The combination of claim 8 wherein the cylindrical body of the sleeve means is provided with threads at the free end thereof, the retaining means further comprising a threaded retaining nut mateable with the threads of the sleeve means to retain the shaft toe mounting means within the sleeve means.

10. The combination of claim 8 wherein the sleeve means is formed on the kettle at the lowermost location thereof to mount a vertical agitator.

11. The combination of claim 8 wherein the sleeve means is formed on the kettle at a location spaced from the lowermost location thereof to mount an inclined agitator.

12. The combination of claim 7 wherein the sleeve means is formed on the kettle at the lowermost location thereof to mount a vertical agitator.

13. The combination of claim 7 wherein the sleeve means is formed on the kettle at a location spaced from the lowermost location thereof to mount an inclined agitator.

14. The combination of claim 7 wherein the toe bearing element is formed in an ogive shape, the first bearing surfaces comprising the outer surfaces of the toe bearing element.

15. The combination of claim 7 wherein those portions of the toe bearing element nearmost the cylindrical body element are formed in the shape of the frustum of a cone with portions of the toe bearing element nearmost the distal end of the toe bearing element rounding to the distal end thereof from the frusto-conical portion of the toe bearing element.

16. The combination of claim 1 wherein the shaft toe mounting means further comprises a cylindrical terminal portion formed on the cylindrical body portion at the end of the cylindrical body portion opposite the toe bearing element and adjacent the annular bevel, the retaining means comprising a threaded retaining nut mateable with threads located on exterior surfaces of the distal end of the sleeve means, the threaded nut being carried by the cylindrical terminal portion on insertion of the toe shaft mounting means into the sleeve means prior to joining the nut to the threads of the sleeve means.

17. The combination of claim 16 wherein the toe bearing element is formed of a self-lubricating nickel alloy.

18. The combination of claim 17 wherein the cylindrical body element of the shaft toe mounting means and wherein the sleeve means are formed of stainless steel.

19. The combination of claim 17 wherein the second bearing surfaces are formed of stainless steel.

* * * * *

UNITED STATES PATENT AND TRADEMARK OFFICE
CERTIFICATE OF CORRECTION

PATENT NO. : 5,570,956
DATED : November 5, 1996
INVENTOR(S) : Valentino Gabriele It is certified that error appears in the above-indentified patent and that said Letters Patent is hereby corrected as shown below:

Title page, item [73], Assignee: should read--J.C. Pardo & Sons--.

Signed and Sealed this

Fourteenth Day of January, 1997

Attest:

BRUCE LEHMAN

*Attesting Officer* *Commissioner of Patents and Trademarks*